US011484091B2

(12) United States Patent
Issler et al.

(10) Patent No.: US 11,484,091 B2
(45) Date of Patent: Nov. 1, 2022

(54) WATERPROOF SHOES AND METHOD FOR PREPARING THE SAME

(71) Applicant: Columbia Insurance Company, Omaha, NE (US)

(72) Inventors: James E. Issler, Greenwich, CT (US); Thomas McClaskie, Bethlehem, PA (US)

(*) Notice: Subject to any disclaimer, the term of this patent is extended or adjusted under 35 U.S.C. 154(b) by 213 days.

(21) Appl. No.: 16/752,810

(22) Filed: Jan. 27, 2020

(65) Prior Publication Data

US 2020/0237047 A1    Jul. 30, 2020

Related U.S. Application Data

(60) Provisional application No. 62/797,619, filed on Jan. 28, 2019.

(51) Int. Cl.
| | |
|---|---|
| *A43B 7/12* | (2006.01) |
| *A43B 7/10* | (2022.01) |
| *A43D 25/06* | (2006.01) |
| *G01M 3/10* | (2006.01) |
| *G01N 3/20* | (2006.01) |
| *A43B 1/10* | (2006.01) |

(52) U.S. Cl.
CPC .................. *A43B 7/12* (2013.01); *A43B 1/10* (2013.01); *A43D 25/06* (2013.01); *G01M 3/103* (2013.01); *G01N 3/20* (2013.01)

(58) Field of Classification Search
CPC ........... A43B 7/12; A43B 1/10; A43B 7/1405; A43B 7/1415; A43D 25/06; G01N 3/20; G01M 3/103; A41D 13/1209; A41D 13/0002
See application file for complete search history.

(56) References Cited

U.S. PATENT DOCUMENTS

| | | | | |
|---|---|---|---|---|
| 4,799,384 | A * | 1/1989 | Casali | G01M 3/06 73/45.5 |
| 6,176,025 | B1 * | 1/2001 | Patterson | A43B 7/1445 36/35 B |
| 2004/0139628 | A1 * | 7/2004 | Wiener | A43B 23/07 36/55 |
| 2005/0210708 | A1 * | 9/2005 | Chen | A43B 7/125 36/55 |
| 2010/0319221 | A1 * | 12/2010 | McClaskie | A43B 9/10 36/43 |
| 2014/0283411 | A1 * | 9/2014 | Nabernik | A43B 7/087 36/83 |
| 2017/0143059 | A1 * | 5/2017 | Gallagher | B32B 5/18 |

* cited by examiner

*Primary Examiner* — Sharon M Prange
*Assistant Examiner* — Erick I Lopez
(74) *Attorney, Agent, or Firm* — IP Attorneys Group, LLC

(57) ABSTRACT

The present invention is related to a water-resistant shoe and a method of making the water-resistant shoe. In most embodiments the shoe comprises an outsole, an insole, an upper, and a bootie product comprised of a bootie, a bootie liner, a strobel and a gasket. In many embodiments water-resistant materials such as tape or glue are used to cover all seams and joints. In some embodiments the different pieces are tested for water-resistance before combining and in others the final shoe is tested for water-resistance. The present shoe and method provide a comfortable yet water-resistant shoe.

20 Claims, 10 Drawing Sheets

WATERPROOF SHOES AND METHOD FOR PREPARING THE SAME

CROSS-REFERENCE TO RELATED APPLICATION

This application claims priority to and the benefit of U.S. Provisional Patent Application No. 62/797,619, filed Jan. 28, 2019 and titled "Water-resistant Shoes and Method for Preparing the Same." The content of the above-identified Application is relied upon and incorporated herein by reference in its entirety.

BACKGROUND OF THE INVENTION

The present invention is related to a water-resistant shoe and a method of making the water-resistant shoe.

Often, users desire shoes which are water-resistant to avoid inclement weather such as snow or rain. Such shoes are often desired to be comfortable and be water-resistant over the entire area covered. However, this is often not the case, and many times water-resistant shoes are uncomfortable as they do not allow the foot to breathe and are made of uncomfortable materials, or they contain non-water-resistant areas such as around the laces or stitching which can cause leakage into the shoe. This is especially problematic when the user steps into a puddle or snow bank which raises over the sole. If the shoe cannot breathe, the water which makes its way into the shoe does not have an efficient way to get back out and can cause discomfort and irritation to the foot.

Typically, water-resistant shoes such as rain boots are made of a water-resistant material that may be permeable to water vapor but is impermeable to liquids. In some cases, the water-resistant material is an outer layer with a softer inner layer. Many of these shoes are uncomfortable due to the water-resistant materials used, the lack of supportive insoles, or the lack of ability for the shoe to breathe or let out perspiration from the foot. In other cases, the water-resistant material is the inner layer while the outer layer can be permeated by water. These embodiments have a negative effect that water can get trapped between the water permeable and water-resistant layer which can damage the shoe.

Different methods for making these water-resistant shoes typically skip key steps in the process or neglect important steps such as ensuring the efficacy of the water-resistant materials and construction. Thus, while some areas of the shoe may be water-resistant, such as the sole or bottom portions of the upper, often areas such as stitching, laces, or other joints are not properly sealed and tested for water permeability.

Thus, what is required is a new type of water-resistant shoe and a method for designing said water-resistant shoe which ensures the water-resistance of the method. Ideally this shoe should be comfortable and allow water vapor to permeate.

SUMMARY OF THE INVENTION

The present invention is related to a water-resistant shoe and a method of making the water-resistant shoe. In most embodiments the she comprises an upper, an outsole, a bootie, and an insole. In most embodiments the bootie comprises a bootie material, a bootie liner, a strobel, and a gasket. In some embodiments the insole is one piece and in others it is more than one piece. In most embodiments at least some of the seams created by attaching the different parts are the shoe are covered with a sealant selected from the group consisting of water-resistant tape, non-water-resistant tape, water-resistant glue, non-water-resistant glue, water-resistant primer, non-water-resistant primer, and combinations thereof.

In most embodiments the shoe is made by attaching a bootie liner to a bootie which forms a first bootie product, attaching a strobel to the bottom of the first bootie product which forms a second bootie product, molding a gasket over the bottom of the second bootie product which forms a third bootie product, attaching the upper to the third bootie product to form a first upper product, and attaching the first upper product to the outsole. In some embodiments where an insole is provided the insole is provided by attaching the insole between the outsole and first upper product.

In some embodiments the gasket is molded by inserting a last into the second bootie product, applying glue to the bottom of the second bootie product, heat activating the gasket, pressing the gasket onto the bottom of the second bootie product which forms the third bootie product, freezing the third bootie product, and removing the last from the third bootie product.

In many embodiments the water-resistance of the shoe is tested at various points in its construction. In some embodiments the third bootie product is tested by securing the third bootie product to a bootie testing machine, pressurizing the inside of third bootie product with a gas, submerging at least part of the third bootie product under a liquid, and inspecting the liquid for gas leakage from the third bootie product. In other embodiments the fully constructed shoe is tested by securing the shoe to a flex test machine, placing at least one liquid sensor inside of the shoe, submerging at least a part of the shoe under a liquid, and detecting liquid leakage into the shoe with the sensor.

In some embodiments the different materials that make up the shoe are cut from a fabric. In some embodiments at least some of the materials are water-resistant. In many of the embodiments the seams are sealed with water-resistant materials or the different layers are combined with water-resistant materials.

DETAILED DESCRIPTION OF THE INVENTION

The present invention is related to a water-resistant shoe and a method of making the water-resistant shoe.

Figure 1:
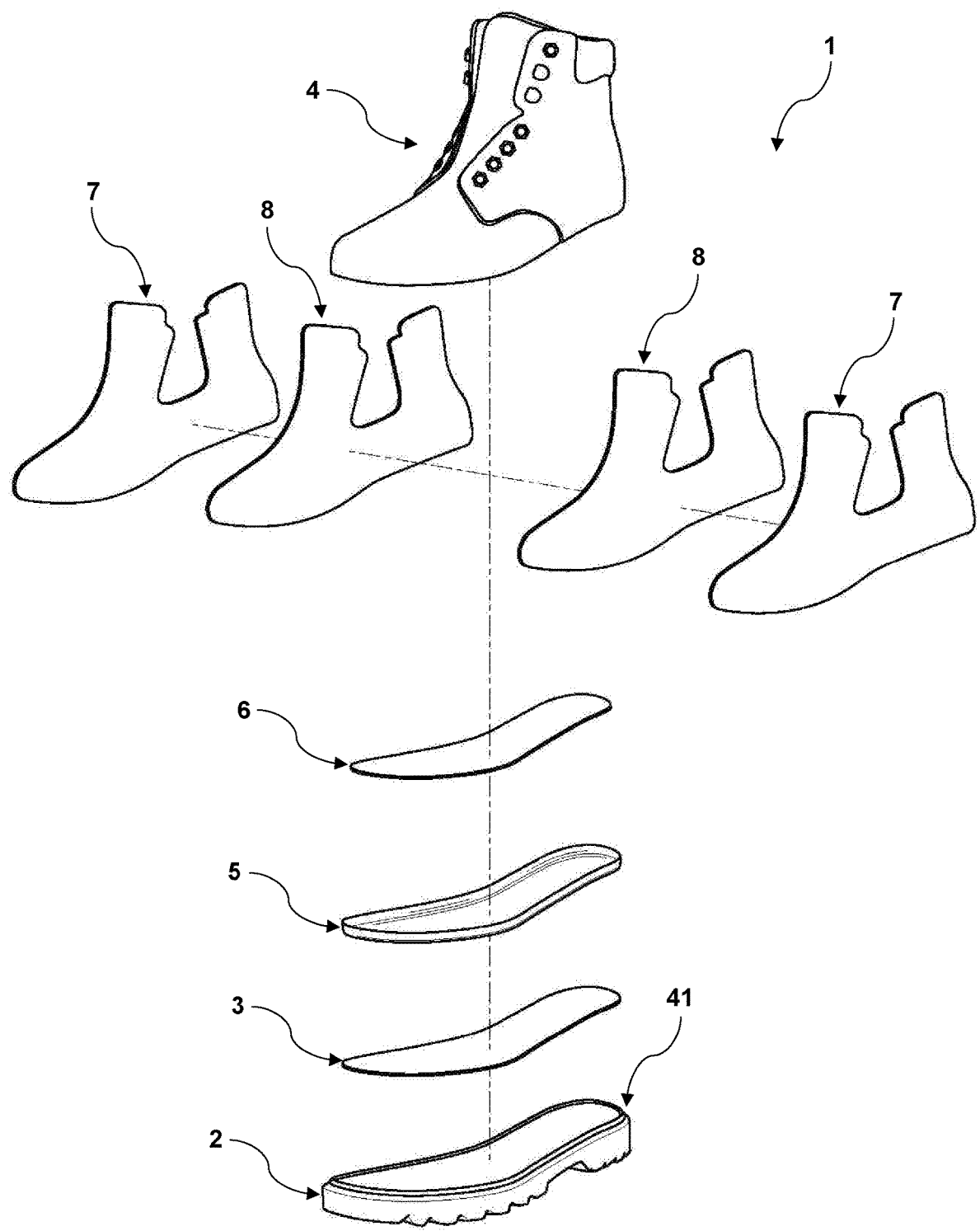
FIG. 1 is an exploded view of a water-resistant shoe cover according to one embodiment of the invention.

FIG. 1 shows an exploded view of a water-resistant shoe 1 in accordance with one embodiment of the invention. Shoe 1 comprises several parts, including outsole 2, insole 3, upper 4, gasket 5, strobel 6, bootie 7, and bootie liner 8. In many embodiments these components are combined via the method shown in FIG. 2 in order to form water-resistant shoe 1. Generally, the top of each of these components is defined as the side closer to the top (55) of shoe 1, where the foot enters the shoe, the bottom of each of these components is defined as the side closer to the bottom (56) of shoe 1, where outsole 2 contacts the ground, the back of each of these components is defined as the side closer to the back (57) of shoe 1, behind the heel, and the front of each of these components is defined as the side closer to the front (58) of shoe 1, in front of the toe. Each of the steps described in FIG. 2, and the components which make up the steps, will be discussed in more detail below.

Figure 2:
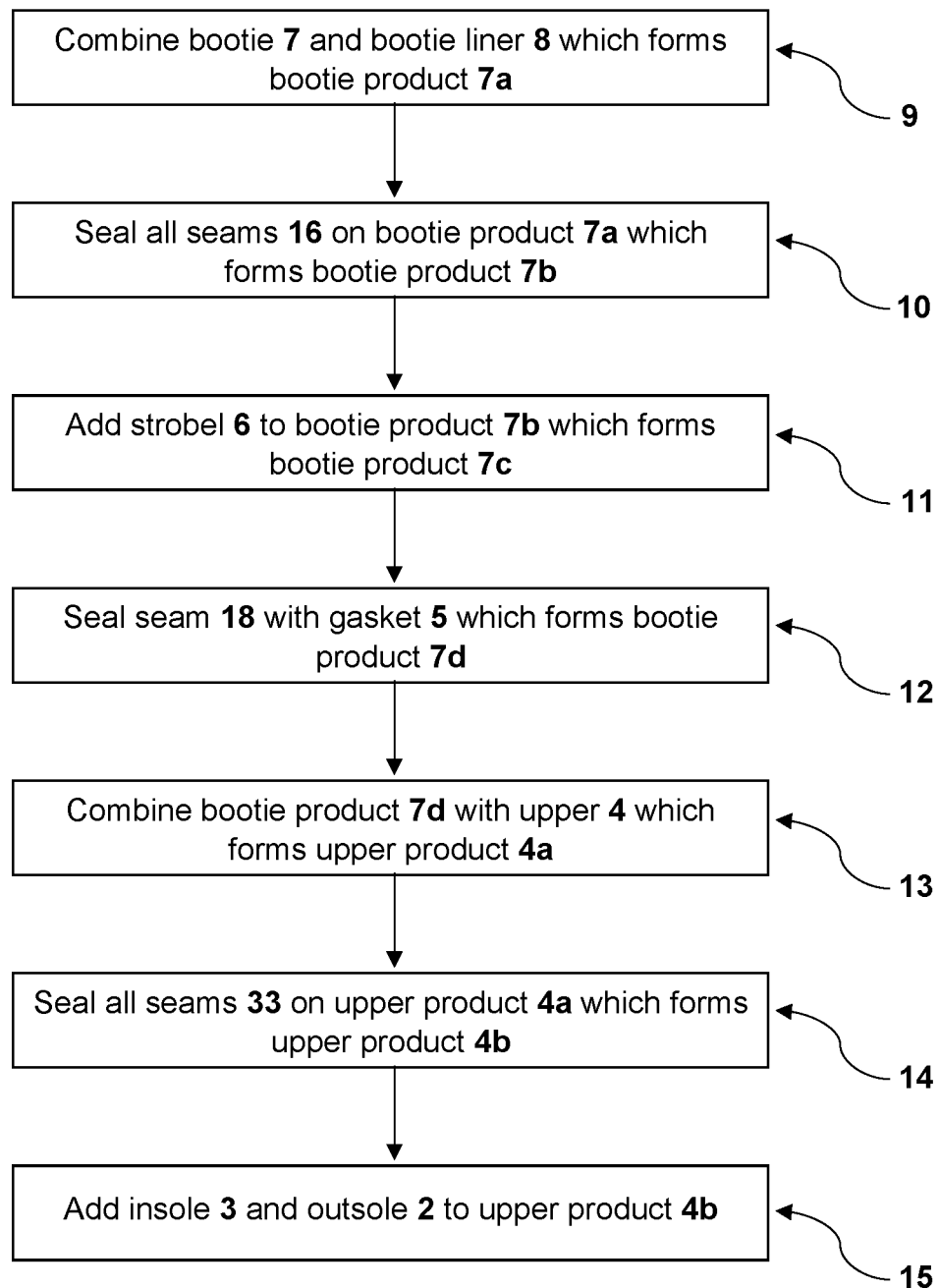
FIG. 2 is a flow chart detailing a method to make the shoe of FIG. 1.
Figure 3:
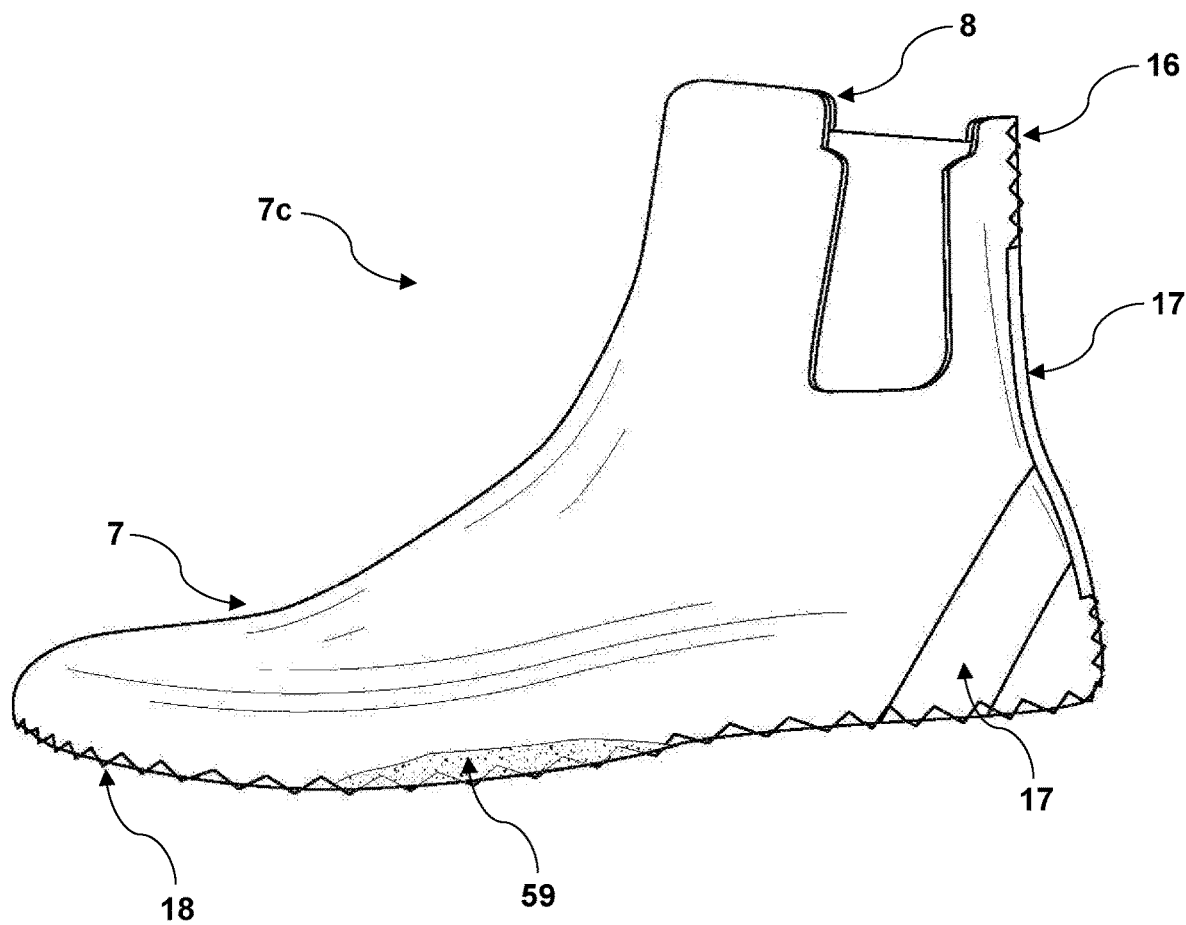
FIG. 3 shows the water-resistant shoe of FIG. 1 in a partially completed state.

For the embodiments described by FIG. 2, the first step (9) is combining bootie 7 and bootie liner 8, which forms bootie product 7a. In some embodiments bootie 7 is made up of a single water-resistant layer, in other embodiments bootie 7 is made up of multiple water-resistant layers, and in other embodiments bootie 7 is made up of multiple layers which are either water-resistant or not water-resistant. In some embodiments with multiple layers, each layer is the same material, and in other embodiments they are different materials. In some embodiments the water-resistant layer is permeable to water vapor. In some embodiments the water-resistant layer is made of water-resistant plastics, comprising polyethylene, polypropylene, polyurethane, polyvinylchloride, polytetrafluoroethylene, polyethylene terephthalate, and combinations thereof. In some embodiments the plastics are thermoplastic and in others they are thermoset. In other embodiments the water-resistant layer is made of rubber, foam, polymers, water-resistant fabrics, and combinations thereof. In many embodiments bootie liner 8 is made of a softer more absorbent material than the water-resistant layer of bootie 7. In some embodiments bootie liner 8 is made out of cotton, wool, polyester, Tencel, hemp, bamboo, leather, water-resistant fabrics, and combinations thereof.

In some embodiments bootie 7 is a single section which is not sewn together, in other embodiments bootie 7 is a single section which is sewn together via a single seam 16, and in other embodiments bootie 7 is two sections sewn together with at least two seams 16. In some embodiments standard thread is used to sew seam 16 together and in others non-wicking or water-resistant thread is used. Water-resistant thread beneficially increases the water-resistant nature of seam 16, however, standard thread is lower in cost, thus both options are important depending on the situation and the required water-resistance. In many embodiments seam 16 is sewn with zig-zag stitches. Zig-Zag stitches beneficially increase the strength of the stitch and give a tighter more water-resistant seam 16.

In most embodiments where the bootie 7 sections are sewn together, bootie liner 8 is combined with bootie 7 to form bootie product 7a using the same stitch as a means of beneficially reducing the amount of stitching and thus piercing of the water-resistant bootie 7. In other embodiments bootie liner 8 is separately sewn into bootie 7. These embodiments are useful when bootie 7 is a single sheet which is not sewn together. In other embodiments bootie liner 8 is first sewn into bootie 7 and then the combined bootie liner 8 and bootie 7 sections are joined together to form bootie product 7a, as described above. These embodiments are useful as it is easier to combine the sections together if bootie liner 8 is already joined to bootie 7.

In other embodiments the different bootie 7 or bootie liner 8 sections are combined to form bootie product 7a using water-resistant glue, in other embodiments the different bootie 7 sections are melted together to form a monolithic unit, and in other embodiments the different bootie 7 or bootie liner 8 sections are combined to form bootie product 7a using water-resistant tape.

In many embodiments the different sections of bootie 7 or bootie liner 8 are cut from a sheet of material. In others they are molded from a raw material.

For embodiments which use stitching, after combining bootie 7 and bootie liner 8 and forming bootie product 7a, in the embodiments described by FIG. 2 the second step (10) is sealing all seams 16 on bootie product 7a which forms bootie product 7b. In some embodiments seams 16 are sealed with water-resistant tape 17, in other embodiments seams 16 are sealed with a primer followed by water-resistant glue (59), in other embodiments seams 16 are sealed with water-resistant glue without a primer, and in other embodiments a water-resistant material is melted or glued over seams 16. Water-resistant tape 17 is the easiest to apply and typically has a lower cost than the water-resistant glue, but does not have as easy of a coverage as a liquid. In contrast, the steps of priming and adding water-resistant glue are more intensive and costly, but can cover tight spaces or other areas which the solid water-resistant tape has trouble accessing. Thus, in some embodiments a combination of water-resistant tape and water-resistant glue are used to seal the different seams 16 or sections of seams 16. The most labor intensive is the melting or gluing of a water-resistant material over seams 16 as this involves pressing the material and ensuring that the material fully encases seams 16. However, if done properly, this process gives the best seal of seams 16 as it fully covers and encases seams 16. As such, this method is used in step 12 to seal the seams 18 between strobel 6 and bootie 7, and will be discussed in more detail in that section. The sealing of seams 16 beneficially increases the water-resistant nature of bootie 7. However, in some embodiments seams 16 are not sealed, as a means of reducing the costs of manufacturing the shoe.

After sealing seams 16, in the embodiments described by FIG. 2, the third step (11) involves adding strobel 6 is to bootie product 7b which forms bootie product 7c. Strobel 6 beneficially covers the hole in the bottom of bootie product 7b. In some embodiments the strobel 6 is made of the same material as bootie 7, in some embodiments strobel 6 is made of the same material as bootie liner 8 and in other embodiments strobel 6 is made of a material different from both bootie liner 8 and bootie 7. In some embodiments strobel 6 is made of water-resistant materials, comprising rubber, foam, plastics, polymers, water-resistant fabrics, and combinations thereof. In other embodiments strobel 6 is made of other materials, comprising cotton, wool, polyester, Tencel, hemp, bamboo, leather, and combinations thereof. Embodiments where strobel 6 is made of a water-resistant material are important as it increases the water-resistant nature of bootie 7, and embodiments where strobel 6 is made of a non-water-resistant material are important as it gives greater comfort and absorbency to bootie liner 8. In some embodiments strobel 6 is made of two layers, the inner layer being made of a softer or more absorbent material and the inner layer being made of a water-resistant material, such that strobel 6 gives both the benefits of water-resistance to bootie 7 and absorbency and comfort to bootie liner 8.

As discussed above with combining bootie 7 and bootie liner 8, in some embodiments standard thread is used to sew together bootie product 7b and strobel 6 and in others non-wicking or water-resistant thread is used. Water-resistant thread beneficially increases the water-resistant nature of the seam 18 between bootie product 7b and strobel 6, however, standard thread is lower in cost, thus both options are important depending on the situation and the required water-resistance. In many embodiments seam 18 is sewn with zig-zag stitches. Zig-Zag stitches beneficially increase the strength of the stitch and give a tighter more water-resistant seal. In other embodiments strobel 6 and bootie product 7b are combined to form bootie product 7c using water-resistant glue, in other embodiments strobel 6 and bootie product 7b are melted together to form a monolithic bootie product 7c, and in other embodiments strobel 6 and bootie product 7b are combined to form bootie product 7c using water-resistant tape. The benefits of these different methods are discussed above.

After forming bootie product 7c, for the embodiments described by FIG. 2 the next step (12) involves sealing seam 18 with gasket 5. Gasket 5 beneficially provides both added comfort as well as an additional water-resistant sealing layer. In many embodiments gasket 5 is made of water-resistant plastics, comprising polyethylene, polypropylene, polyurethane, polyvinylchloride, polytetrafluoroethylene, polyethylene terephthalate, and combinations thereof. In some embodiments the plastics are thermoplastic and in others they are thermoset. In other embodiments gasket 5 is made of other water-resistant materials, comprising rubber, foam, polymers, water-resistant fabrics, and combinations thereof.

In many embodiments gasket 5 is cut from a sheet of material. In others it is molded from a raw material.

Figure 4:
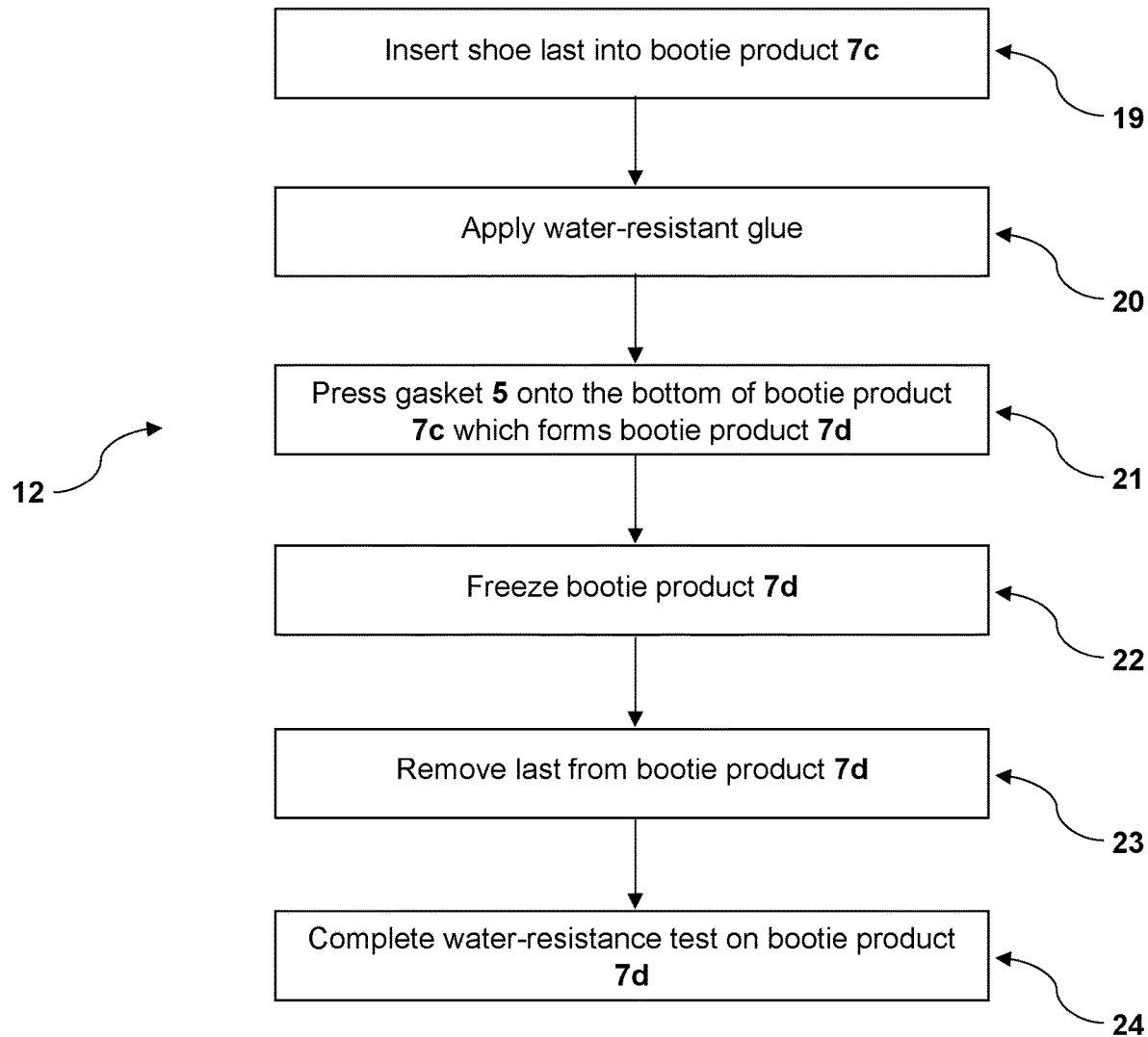
FIG. 4 is a flow chart detailing a method to make a portion of the shoe of FIG. 1.

In many embodiments, step 12 involves six main steps, as shown in FIG. 4. First (step 19), a shoe last is inserted into bootie product 7c to help maintain the correct positioning and shape for the bootie. Second (step 20), water-resistant glue is added. In some embodiments water-resistant glue is added to the bottom of strobel 6, in other embodiments water-resistant glue is added to the top of gasket 5, and in other embodiment water-resistant glue is added to both the bottom of strobel 6 and the top of gasket 5. In some embodiments more than one layer of glue is added and in others only one layer of glue is added. In some embodiments the water-resistant glue and gasket 5 are both heated to activate the adhesion, and in others only gasket 5 is heat activated. Heat activation is important as it gives a better seal and adhesion than if the glue and gasket were used at room temperature. In many embodiments heat activation involves heating the component to a specific temperature. In some embodiments the material is heated to under 50 degrees Celsius, in others 50-100 degrees Celsius, and in others above 100 degrees Celsius. Different materials have different temperatures at which they optimally become pliable such that they can be pressed and adhere to one another, which is why the different ranges are important. Third (step 21), gasket 5 is added to the bottom of bootie product 7c and pressed to enhance and solidify the adhesion. This process forms bootie product 7d. In most embodiments gasket 5 covers all of seam 18. In some embodiments gasket 5 is pressed onto bootie product 7c by hand, and in others a machine or other device is used to press gasket 5 onto bootie product 7c. Pressing by machine or other device is beneficial as it allows a more distributed and greater force to be applied to gasket 5. Fourth (step 22), bootie product 7d is frozen. In some embodiments the freezing process involves running bootie product 7d through a chamber which is less then or equal to 10 degrees Celsius. In other embodiments the chamber is less than or equal to 0 degrees Celsius. In some embodiments, the freezing process involves placing bootie product 7d in a chamber and leaving it in there until it reaches less than or equal to 10 degrees Celsius, and in others it is left in the chamber until it reaches less than or equal to 0 degrees Celsius. Freezing beneficially cools down bootie product 7d in embodiments where gasket 5 and the glue were heat activated, and also quickly fastens the adhesion between gasket 5 and bootie product 7c. Finally (step 23), the last is removed bootie product 7d proceeds to water-resistant testing (step 24) to ensure the efficacy of the water-resisting materials and procedures described above.

In some embodiments, the ordering of water-resistant sealing is completed differently than what is shown in FIG. 2. In some embodiments step 11 is completed before step 10 and thus sealing steps 10 and 12 are completed sequentially. In some embodiments, applying the gasket (step 12) is completed before sealing the seams 16 (step 10). These embodiments are beneficial as it they allow the use of water-resistant tape 17 or other sealing methods to be applied to any exposed seam 18 which was not properly sealed by gasket 5. In other embodiments, applying the gasket (step 12) is completed after sealing the seams 16 (step 10). These embodiments are useful as gasket 5 can reinforce and seal any sealing method on the lower side of bootie 7 which are close to or engaged with seam 18. In other embodiments seam 18 is sealed first with water-resistant tape 17, or other sealing methods described above, and subsequently sealed by gasket 5, and in other embodiments seam 18 is only sealed with water-resistant tape 17, or other sealing methods described above, and is not sealed by gasket 5.

Figure 5:
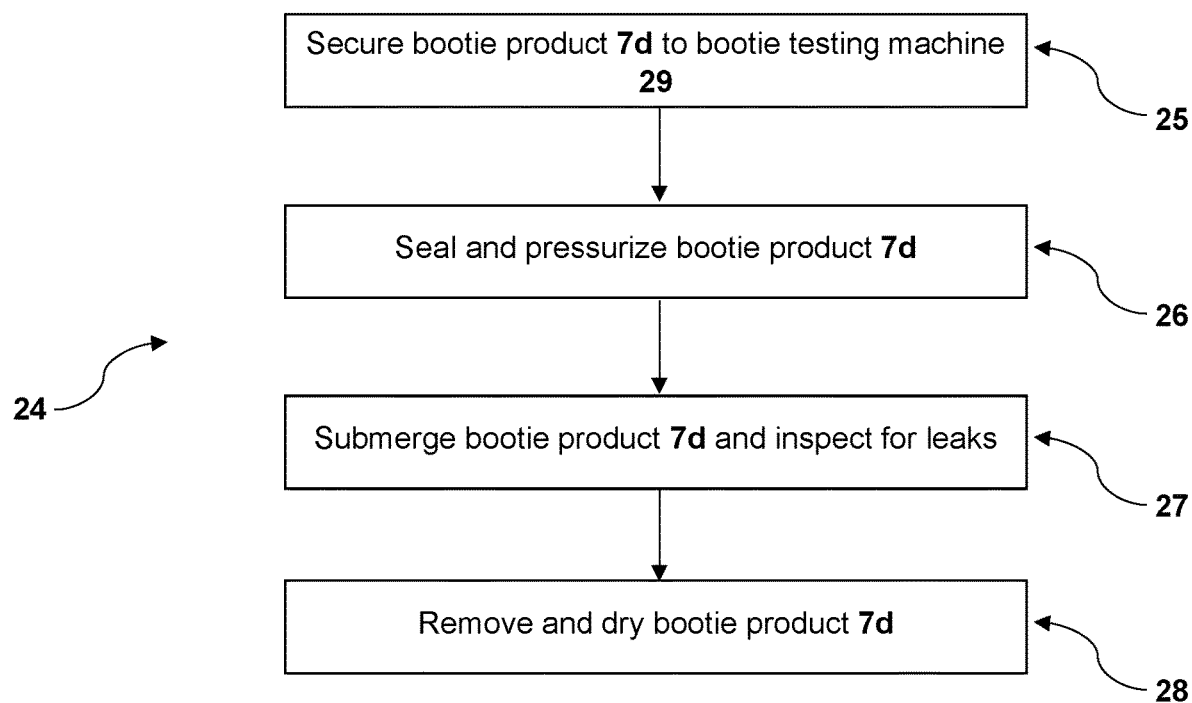
FIG. 5 is a flow chart detailing a method to make a portion of the shoe of FIG. 1.
Figure 6:
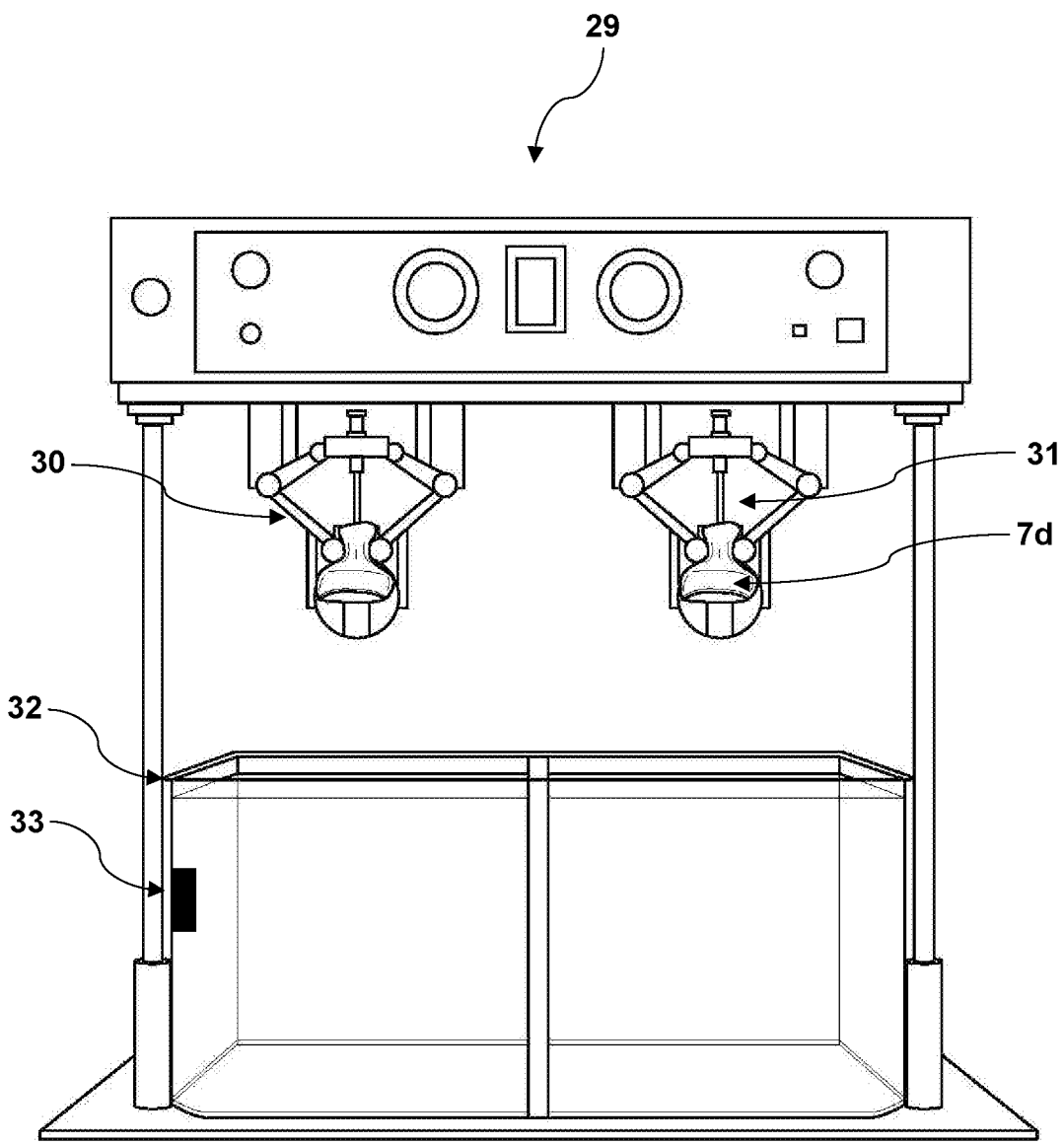
FIG. 6 shows a machine used to test the water-resistance of a portion of the shoe of FIG. 1.

As shown in FIG. 5, in many embodiments the water-resistance testing of bootie product 7d comprises four steps. First (step 25), bootie product 7d is secured to bootie testing machine 29 as seen in FIG. 6. In most embodiments, bootie product 7d is secured to bootie testing machine 29 by clamp 30. Second (step 26), bootie testing machine 29 seals the top of bootie product 7d and pressurizes the inside of bootie product 7d with air or other suitable gas including oxygen, nitrogen, argon, or combinations thereof. In most embodiments, bootie product 7d is pressurized by a gas running through hose 31. Third (step 27), pressurized bootie product 7d is lowered into water tank 32 and inspected for air leakage from the inside of bootie product 7d into water tank 32. In some embodiments this inspection is completed manually and in others it is completed automatically. In some embodiments where leakage is completed automatically, the leakage is detected by pressure sensor 33 which detects water movement cause by the air escaping. In other embodiments water tank 32 is sealed and any escaped air is detected by an increase in pressure of the sealed tank. If no leakage is visualized or detected, bootie product 7d is effectively sealed, however, if leakage is observed, bootie product 7d has been ineffectively sealed. In some embodiments ineffectively sealed bootie products 7d are discarded, and in others any detected leak is re-sealed with water-resistant tape 17, or other sealing methods described above. Fourth (step 28), bootie product 7d is removed from water tank 32, depressurized and unsecured from bootie testing machine 29, and dried. In some embodiments, bootie product 7d is dried by hanging to air dry, in other embodiments it is heated, and in other embodiments it is blown dry.

In some embodiments for bootie products 7d which pass the water-resistance testing, they next proceed to the fifth step shown in FIG. 2 (step 13), which comprises combining bootie product 7*d* with upper 4 to form upper product 4*a*. In some embodiments upper 4 is made of water-resistant materials, comprising rubber, foam, plastics, polymers, water-resistant fabrics, and combinations thereof. In other embodiments upper 4 is made of other materials, comprising cotton, wool, polyester, Tencel, hemp, bamboo, leather, and combinations thereof. Embodiments where upper 4 is made of water-resistant material is important as it increases the water-resistant nature of shoe 1 and embodiments where upper 4 is made of a non-water-resistant material are useful as often non-water-resistant materials are more aesthetically pleasing or traditional upper 4 materials. In some embodiments upper 4 is made of one layer and in others it is made of multiple layers. In some embodiments where upper 4 is made of multiple layers, each layer is a different material. These embodiments are useful as they allow a water-resistant layer to be placed on the inside or outside of upper 4, which give the benefits of added water-resistant nature of shoe 1 while also maintaining a standard upper 4 material or construction. In other embodiments with multiple upper 4 layers, some of the layers are the same. These embodiments beneficially give ease of construction.

Similar to bootie 7, in some embodiments upper 4 is a single section which is not sewn together, in other embodiments upper 4 is a single section which is sewn together via seam 33, and in other embodiments upper 4 is two sections sewn together with multiple seams 33. In some embodiments standard thread is used to sew seam 33 together and in others non-wicking or water-resistant thread is used. Water-resistant thread beneficially increases the water-resistant nature of the area of seam 33, however, standard thread is lower in cost, thus both options are important depending on the situation and the required water-resistance. In many embodiments seam 33 is sewn with zig-zag stitches. Zig-Zag stitches beneficially increase the strength of the stitch and give a tighter more water-resistant seam 33.

As with the bootie 7 and bootie liner 8 construction described above, in most embodiments where the upper 4 sections are sewn together, bootie product 7*d* is combined with upper 4 to form upper product 4*a* using the same stitch as a means of beneficially reducing the amount of stitching and thus piercing of the upper 4. In other embodiments bootie product 7*d* is separately sewn into upper 4. These embodiments are useful when upper 4 is a single sheet which is not sewn together. In other embodiments bootie product 7*d* is first sewn into upper 4 and then the combined bootie product 7*d* and upper 4 sections are joined together to form upper product 4*a*, as described above. These embodiments are useful as it is easier to combine the sections together if bootie product 7*d* is already joined to upper 4.

In other embodiments upper 4 and bootie product 7*d* are combined to form upper product 4*a* using water-resistant glue, and in other embodiments upper 4 and bootie product 7*d* are combined to form upper product 4*a* using water-resistant tape.

For embodiments which use stitching, after combining upper 4 and bootie product 7*d* and forming upper product 4*a*, in the embodiments described by FIG. 2 the sixth step (14) is sealing all seams 33 on upper product 4*a*, which forms upper product 4*b*. In some embodiments seams 33 are sealed with water-resistant tape 17, in other embodiments seams 33 are sealed with a primer followed by water-resistant glue (59), in other embodiments seams 33 are sealed with water-resistant glue without a primer, and in other embodiments a water-resistant material is melted or glued over seams 33. Water-resistant tape 17 is the easiest to apply and typically has a lower cost than the water-resistant glue, but does not have as easy of a coverage as a liquid. In contrast, the steps of priming and adding water-resistant glue are more intensive and costly, but can cover tight spaces or other areas which the solid water-resistant tape has trouble accessing. Thus, in some embodiments a combination of water-resistant tape and water-resistant glue are used to seal the different seams 33 or sections of seams 33. The most intensive is the melting or gluing of a water-resistant material over seams 33 as this involves pressing the material and ensuring that the material fully encases seams 33. However, if done properly, this process gives the best seal of seams 33 as it fully covers and encases seams 33. In some embodiments seams 33 are not sealed, as a means of reducing the costs of manufacturing the shoe.

Figure 7:
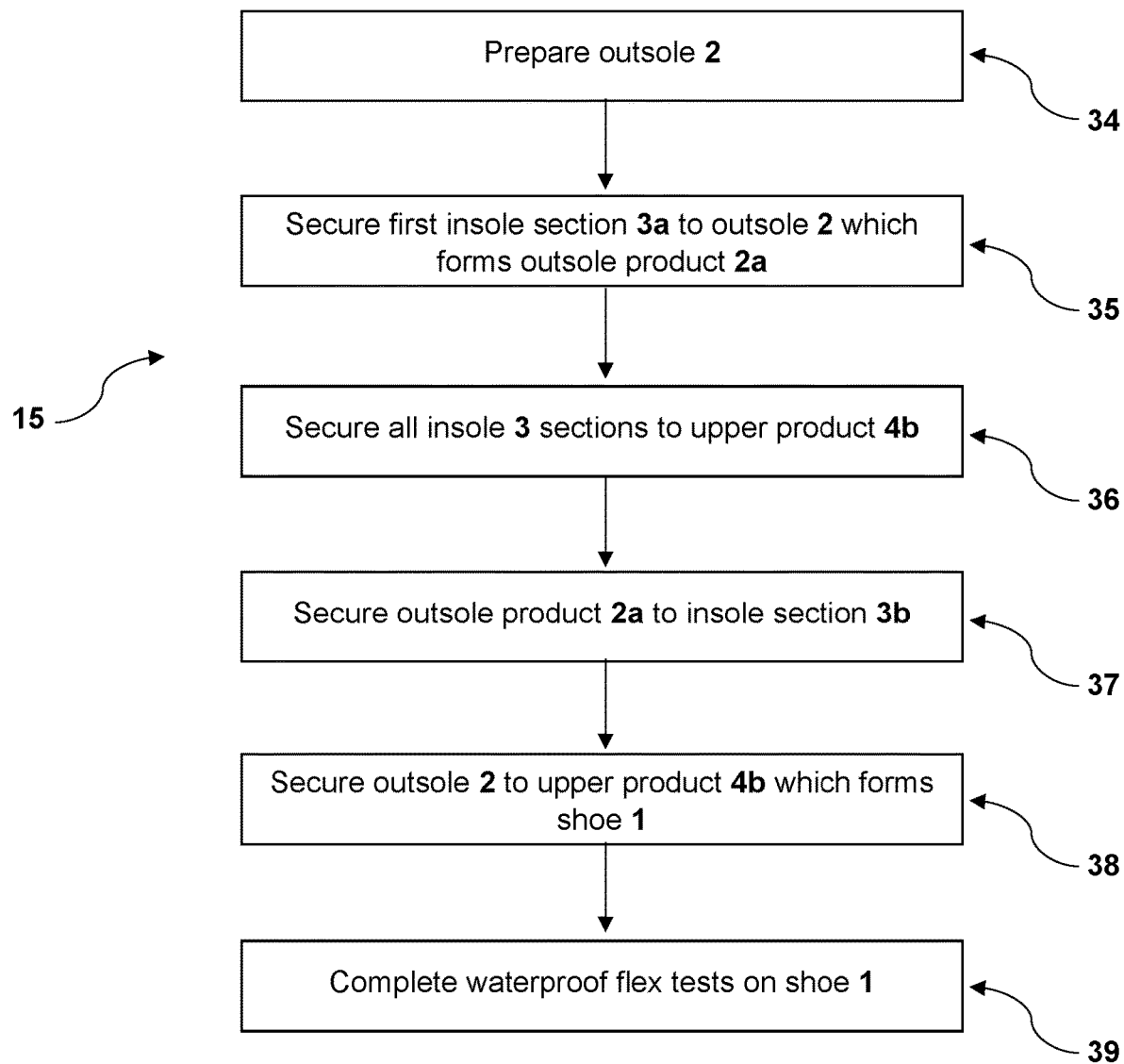
FIG. 7 is a flow chart detailing a method to make a portion of the shoe of FIG. 1.

Finally, for the embodiments described by FIG. 2, after sealing of upper product 4*a*, upper product 4*b* is combined with insole 3 and outsole 2 to form fully constructed shoe 1 (step 15). As seen in FIG. 7, in some embodiments combining these three pieces involves six steps. First (step 34), outsole 2 is prepared by adding sealing tape 40 around the perimeter of outsole 2 for form water-resistant lip 41. In some embodiments sealing tape 40 is a hot-melt sealing tape, in others it is an acrylic sealing tape, and in others it is other water-resistant tape. In some embodiments sealing tape 40 is added to the top of outsole 2, in other embodiments sealing tape 40 is added to the bottom of outsole 2, and in other embodiments sealing tape 40 is added to both the top and bottom of outsole 2. Adding sealing tape 40 beneficially seals any cracks or gaps in outsole 2 and provides a more efficient water-resistant seal. Second (step 35), for some embodiments with multiple insole 3 sections, a first insole section 3*a* is secured to outsole 2. To complete step 35, in some embodiments glue is added to the bottom of insole section 3*a* and to the area on the top of outsole 2 where insole section 3*a* will be secured. Then the glued pieces are pressed together to form outsole product 2*a*. In other embodiments the glue is only added to the bottom of insole section 3*a* and on other embodiments the glue is only added to the top of outsole 2 where insole section 3*a* will be secured. For embodiments which use multiple insole 3 sections, step 36 involves securing insole 3 into upper product 4*b*. Step 36 in some embodiments is completed by inserting a shoe last into upper product 4*b*, gluing the bottom front portion of upper product 4*b* and the top of upper product 4*b*, where insole section 3*a* is secured, and pressing these pieces together. As above, in some embodiments only one piece has glue applied to it. After partially securing upper product 4*b* and outsole product 2*a*, for some of these embodiments glue is applied to the top of insole section 3*b* and the area on the bottom of upper product 4*b* where insole section 3*b* will be secured, and these pieces are pressed together. As above, in some embodiments only one piece has glue applied to it. Once insole section 3*b* is secured, glue is applied to the bottom of insole section 3*b* and to the area on the top of outsole 2 where insole section 3*b* will be secured, and these pieces are pressed together (step 37). As above, in some embodiments only one piece has glue applied to it. Then, in some embodiments outsole 2 is secured to upper product 4*b* (step 38). In some embodiments this is completed using stitching. For some embodiments the stitching method is opanka style which connects upper 4, outsole 2 and insole 3 together. In most embodiments which use stitching, the stitching is completed in such a way that is does not penetrate or pierce water-resistant lip 41. In other embodiments water-resistant tape is used to secure outsole 2 to upper product 4*b*, and in other embodiments glue is used to secure outsole 2 to upper product 4*b*. For all the embodiments discussed above which use glue, in some embodiments the glue is a water-resistant glue and in other embodiments the glue is not water-resistant. In some embodiments the shoe last is removed before step 38 and in others it is removed after step 38. The shoe last helps maintain the shape of the shoe while securing outsole 2, however, it can also get in the way of stitching or other securing methods, thus in some cases it is removed prior to this step.

In other embodiments only one insole 3 section is used. In most of these embodiments, step 35 is omitted. These embodiments are useful as they reduce the number of steps involved in the outsole securing process. In other embodiments multiple insole 3 sections are used but they are all secured first to upper product 4b, such that step 35 is omitted. While securing insole 3 with glue beneficially allows insole 3 to be secured without tacking, which has the potentially detrimental effect of piercing upper product 4b, thus potentially damaging the water-resistant nature upper product 4b, in some embodiments insole 3 is secured to upper product 4b using tacking or stitching methods.

Figure 8:
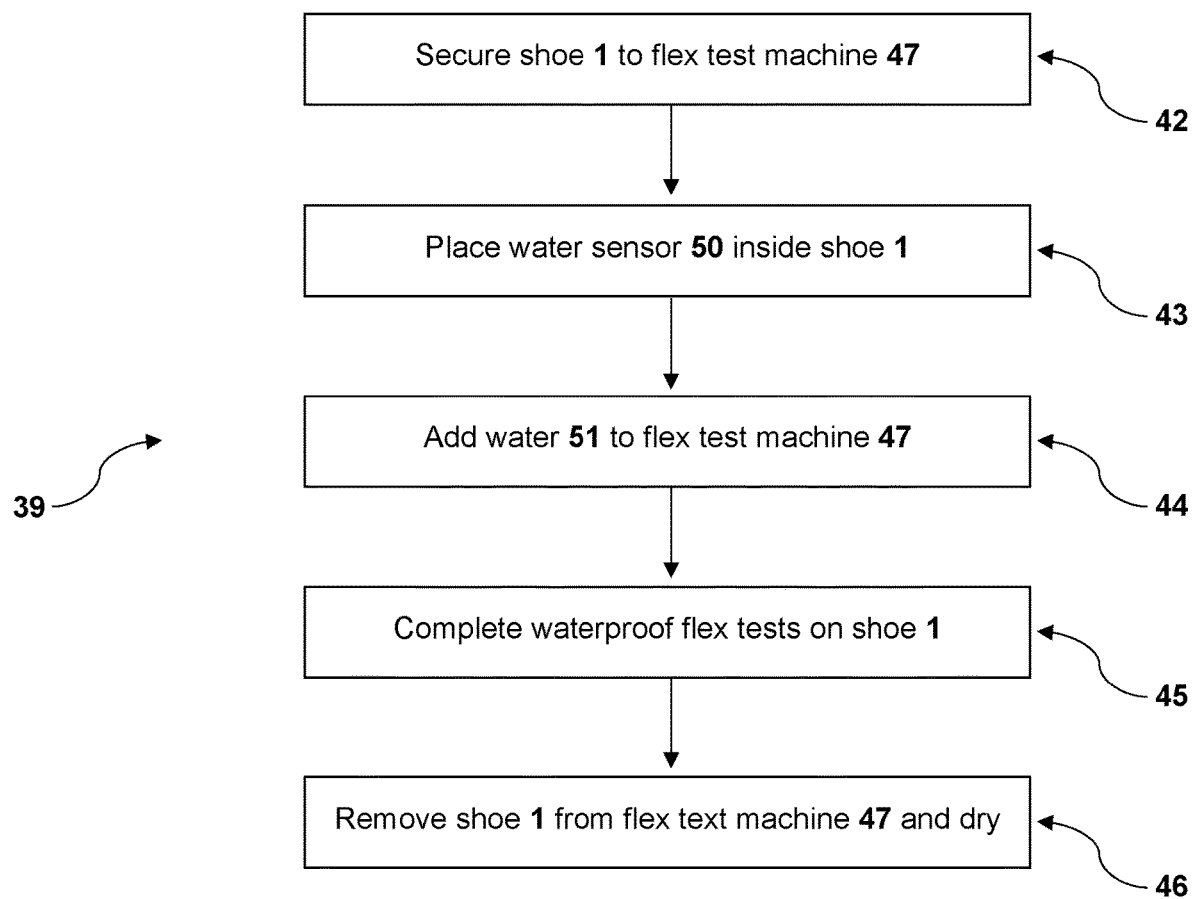
FIG. 8 is a flow chart detailing a method to make a portion of the shoe of FIG. 1.
Figure 9:
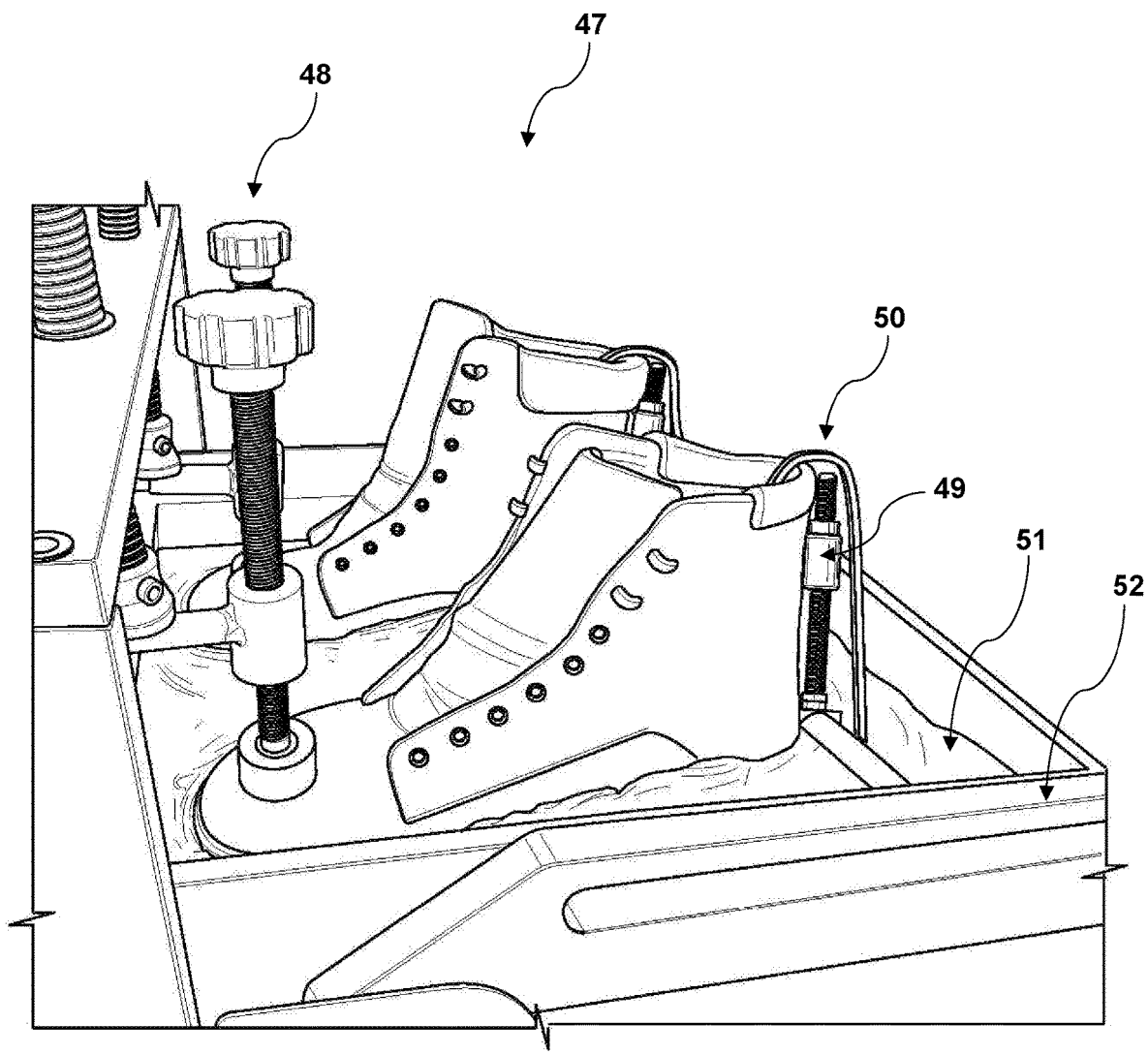
FIG. 9 shows a machine used to test the water-resistance of the shoe of FIG. 1.
Figure 10:
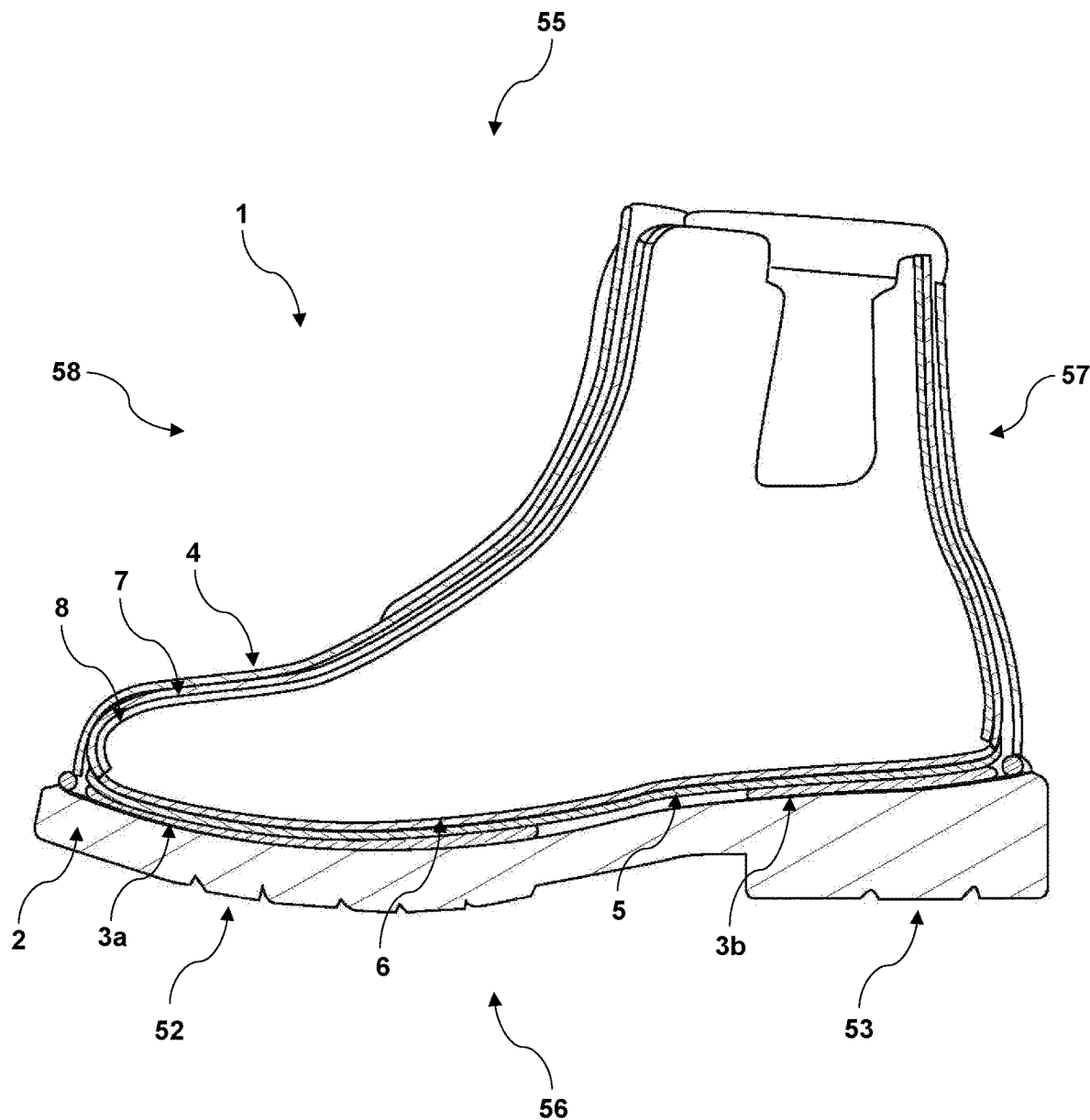
FIG. 10 shows a cross-sectional view of the shoe of FIG. 1.

In most embodiments after the construction of shoe 1, shoe 1 is placed through a water-resistance flex test (step 39). As described by FIG. 8, in some embodiments the water-resistance flex text comprises five steps. First (step 42), shoe 1 is secured to flex test machine 47. In some embodiments the front of shoe 1 is secured by clamp 48 and the back of shoe 1 is secured by clamp 49. In other embodiments shoe 1 is secured by using a flexible shoe last. After securing shoe 1, water sensor 50 is placed inside shoe 1 (step 43). In some embodiments one water sensor 50 is used and in others multiple water sensors 50 are used. Multiple water sensors 50 help the sensors cover a larger area inside of shoe 1 but increases the costs of flex test machine 47. In some embodiments water sensor 50 is a separate device and in others it is in communication with flex test machine 47. In some embodiments which use a flexible last to secure shoe 1, water sensor 50 is integrally connected with the last. Next (step 44), water 51 is added to flex test machine 47. In some embodiments water 51 is already present when securing shoe 1 to flex text machine 47, and thus step 44 is not necessary. Having water 51 present beneficially saves the steps of emptying the water from flex text machine 47 and adding it again, however, it makes the securing step more difficult and cumbersome as one has to deal with the water while securing shoe 1 to flex test machine 47. Once secured with water present, the flex test can begin. In many embodiments the flex test involves moving one part of shoe 1 while keeping the other part fixed to imitate walking. In the embodiment of flex test machine 47 shown in FIG. 9, the toe region (52) of shoe 1 is kept pressed against the bottom of flex test machine 47 by clamp 48 while the heel region (53) of shoe 1 is lifted up and down by bar 54. In other embodiments heel region 53 is pressed down while toe region 52 is lifted up and down by a bar or ramp. As with the bootie product 7d testing, if water sensor 50 does not detect any leakage, shoe 1 is effectively sealed, however, if leakage is detected, shoe 1 has been ineffectively sealed. In some embodiments ineffectively sealed shoes 1 are discarded, and in others any detected leak is re-sealed with water-resistant tape 17, or other sealing methods described above. Finally (step 39), shoe 1 is removed from flex test machine 47 and dried. In some embodiments, shoe 1 is dried by hanging to air dry, in other embodiments it is heated, and in other embodiments it is blown dry.

The number of flexes shoe 1 undergoes and similarly the amount of pressure and time bootie product 4d can withstand determines the efficacy of the water-resistance of the respective parts. Thus, in some embodiments shoe 1 is put through only 500 flex tests, which minimally test the water-resistance of shoe 1. In other embodiments shoe 1 is put through 500-1500 flex tests, in others 1500-2000, and in others over 2000. The more flex tests aids in testing the water-resistance of shoe 1, but also puts wear on the shoe, which can decrease its value. Thus, testing around 1500 flexes have been found to be optimal. Similarly, in some embodiments, bootie product 4d is pressurized to under 1 atmosphere, in others approximately 1 atmosphere, in others approximately 2 atmospheres, and in others approximately 3 atmospheres. The different pressures are useful as depending on the embodiments of bootie product 4d, the amount of pressure the various seams can withstand varies before they risk bursting. For example, seams which have been sewn with zig-zag seams and coated with both glue and tape can withstand more pressure then seams which have only been stitched. Additionally, higher pressure tests can be completed for shorter periods of time. Thus, in some embodiments the pressure test is completed for under 30 seconds, in others it is completed for 30 seconds to 1 minute, in others from 1 minute to 5 minutes, and in others over 5 minutes. Typically, the lower the pressure the longer the time the test is completed to ensure proper water-resistance.

FIG. 2 describes one embodiments method for making one embodiment of shoe 1, however, other methods and constructions are envisioned. In some embodiments no insole 3 is provided, and in others a removable insole 3 is provided which is placed inside bootie 7. Embodiments with removable insoles 3 are useful as they allow the user to modify insole 3 to fit their specific needs with regards to arch support, cushioning, and other factors. In other embodiments no bootie 7 is provided, and upper 4 is constructed out of sufficiently water-resistant materials. In some embodiments no bootie liner 8 is provided, and the material of bootie 7 directly contacts the foot placed inside shoe 1. For all of these example embodiments and other similar embodiments the construction method of shoe 1 would differ slightly from the method described in FIG. 2.

While often discussed above, it is intended for all embodiments that the materials used in some embodiments are water-resistant and in others they are not water-resistant. This includes resistant and non-resistant glue, tape, thread, and shoe 1 materials. In some embodiments multiple sealing materials are used over the various seams or joining portions. For example, in some embodiments seam 16 is first sealed with water-resistant glue and then water-resistant tape 17. In other embodiments two or more layers of water-resistant glue are used to seal seam 16 or similar seams. Embodiments with multiple sealing layers beneficially adds to the water-resistance of shoe 1 but increases the cost of production and manufacture. It is envisioned that some embodiments of shoe 1 would be water-resistant to the point that they could be considered waterproof, however, the term water-resistance is used throughout for consistency and clarity.

In some embodiments the various steps described are completed by hand or manually, and in others they are completed using a machine or automatically. In many embodiments a combination of manual and automatic processes are used.

While the present invention has been particularly described, it is evident that many alternatives, modifications and variations will be apparent to those skilled in the art in light of the foregoing description. These descriptions and drawings are exemplary of specific embodiments only and are not intended to be limiting to the scope of the invention defined in the claims. It is therefore contemplated that the claims will embrace any such alternatives, modifications, and variations as falling within the true scope and spirit of the present invention.

What is claimed is:

1. A method for making a shoe comprising the steps of:
   attaching a bootie liner to a bootie to form a first bootie product;
   attaching a strobel to a bottom of said first bootie product to form a second bootie product;
   molding a gasket over a bottom of said second bootie product to form a third bootie product;
   attaching said third bootie product and an upper to form a first upper product;
   attaching an outsole to a bottom of said first upper product;
   wherein said shoe is tested for water-resistance by the steps comprising:
   securing said shoe to a flex test machine;
   placing at least one sensor inside of said shoe;
   submerging at least a part of said shoe under a liquid;
   detecting liquid intrusion into said shoe with said sensor while lifting and releasing at least a portion of said submerged shoe;
   removing said shoe from said flex test machine;
   drying said shoe.

2. The method for making a shoe according to claim 1, wherein said attaching is completed by using the materials selected from the group consisting of water-resistant tape, non-water-resistant tape, water-resistant glue, non-water-resistant glue, water-resistant thread, non-water-resistant thread, water-resistant primer, non-water-resistant primer, and combinations thereof.

3. The method for making a shoe according to claim 1, wherein said step of molding a gasket over a bottom of said second bootie product to form a third bootie product comprises the steps of:
   inserting a last into said second bootie product;
   applying glue to a bottom of said second bootie product;
   heat activating said gasket;
   pressing said gasket onto said bottom of said second bootie product to form said third bootie product;
   freezing said third bootie product;
   removing said last from said third bootie product.

4. The method for making a shoe according to claim 1, wherein said third bootie product is tested for water-resistance before being attached to said upper by the steps comprising:
   securing said third bootie product to a bootie testing machine;
   pressurizing an inside of said third bootie product with a gas;
   submerging at least a part of said third bootie product under a liquid;
   inspecting gas leakage into said liquid from said inside of said third bootie product;
   removing said third bootie product from said bootie testing machine;
   drying said third bootie product.

5. The method for making a shoe according to claim 4, wherein said bootie is pressurized to a pressure of at least 1 atmosphere.

6. The method for making a shoe according to claim 1, wherein said shoe is lifted and released at least 1000 times.

7. The method for making a shoe according to claim 1, further comprising the step of attaching an insole to a bottom of said first upper product.

8. The method for making a shoe according to claim 7, wherein said insole is removable.

9. The method for making a shoe according to claim 1, further comprising the step of attaching a first and second insole to a bottom of said first upper product.

10. The method for making a shoe according to claim 1, wherein said step of attaching a bootie liner to a bootie to form a first bootie product further comprises the steps of:
    cutting a first and second bootie section from a sheet of a bootie material;
    cutting a first and second bootie liner section from a sheet of a bootie liner material, which is different from said bootie material;
    sewing together said first and second bootie and bootie liner sections to form said first bootie product;
    wherein said bootie liner comprises an inside of said first bootie product and said bootie comprises an outside of said first bootie product.

11. A method for making a shoe according to claim 1, further comprising the steps of:
    sealing said outsole;
    attaching a first insole to a top of said outsole to form a first outsole product;
    attaching at least a portion of said first outsole product to a bottom of said first upper product;
    attaching a second insole to a bottom of said first upper product to form a second upper product;
    attaching the remainder of said first outsole product to a bottom of said second upper product.

12. The method for making a shoe according to claim 11, wherein sewing creates at least one seam, and wherein said at least one seam is further sealed using the materials selected from the group consisting of water-resistant tape, non-water-resistant tape, water-resistant glue, non-water-resistant glue, water-resistant primer, non-water-resistant primer, and combinations thereof.

13. The method for making a shoe according to claim 11, wherein at least a part of said sewing is completed using zig-zag stitching.

14. The method for making a shoe according to claim 11, wherein said step of sealing an outsole comprises placing sealing tape around a perimeter of said outsole.

15. The method for making a shoe according to claim 11, wherein said step of attaching the remainder of said first outsole product to a bottom of said second upper product comprises the steps of:
    applying glue to the areas selected from the group consisting of a bottom of said second insole, a top of said outsole, and combinations thereof;
    pressing said second upper product and said first outsole product together;
    sewing together said second upper product and said first outsole product.

16. The method for making a shoe according to claim 15, wherein said step of sewing together said second upper product and said first outsole product is completed using opanka style stitching and water-resistant thread.

17. The method for making a shoe according to claim 1, wherein said molding of said gasket is completed by using the materials selected from the group consisting of polyethylene, polypropylene, polyurethane, polyvinylchloride, polytetrafluoroethylene, polyethylene terephthalate, and combinations thereof.

18. The method for making a shoe according to claim 1 wherein said bootie is made of multiple layers.

19. The method for making a shoe according to claim 18 wherein said multiple layers are made of different materials.

20. The method for making a shoe according to claim 1, wherein said strobel is made of two layers.

\* \* \* \* \*